United States Patent [19]

Yuo et al.

[11] Patent Number: 5,298,598
[45] Date of Patent: Mar. 29, 1994

[54] PREPARATION OF POLYAMIDE WITH MIXTURE OF PHOSPHORUS CATALYSTS

[75] Inventors: Wu-Bin Yuo, Hsinchu; Der-Tarng Su, Chutung; Jeng-Yue Wu; Mao-Song Lee, both of Hsinchu, all of Taiwan

[73] Assignee: Industrial Technology Research Institute, Hsinchu, Taiwan

[21] Appl. No.: 949,221

[22] Filed: Sep. 18, 1992

[51] Int. Cl.$^5$ .............................................. C08G 69/28
[52] U.S. Cl. .................................... 528/336; 502/162; 526/65; 526/66; 528/335; 528/347
[58] Field of Search ....................... 528/336, 335, 347; 526/65, 66

[56] References Cited

U.S. PATENT DOCUMENTS 5,194,573  3/1993  Poll et al. ............................ 528/336
5,245,006  9/1993  Poll et al. ............................ 528/336

Primary Examiner—Harold D. Anderson
Attorney, Agent, or Firm—W. Wayne Liauh

[57] ABSTRACT

A catalyst composition for the polymerization of polyamide/copolyamide comprising a primary catalyst which comprises an alkali metal hypophosphite or an alkali-earth metal hypophosphite, and an organic phosphite cocatalyst. The catalyst composition of this invention is most useful when used in conjunction with the reactive extrusion technology which requires a very fast polymerization rate to take full advantage of this evolving technology.

14 Claims, No Drawings

PREPARATION OF POLYAMIDE WITH MIXTURE OF PHOSPHORUS CATALYSTS

BACKGROUND OF THE PRESENT INVENTION

The present invention relates to a catalyst composition for the production of polyamide/copolyamide which comprises an alkali metal hypophosphite and an organic phosphite. More particularly, the present invention relates to a catalyst composition comprising an alkali metal hypophosphite as the primary catalyst and an organic phosphite as a cocatalyst, to incease the reaction rate during the polymerization of polyamide and/or copolyamide.

Polyamide and copolyamide have been widely used as fibers and engineering plastics. In its application as engineering plastics, polyamide and copolyamide are mainly used to make automobile parts, electric and electronic components, electric wire coatings, tool boxes, and coasters. As fibers, polyamide and copolyamide are used in making fishing nets, carpets, tires and brushes (including toothbrushes, cosmetic brushes and grinding brushes) as well as stockings.

Polyamide/copolyamide can be synthesized using the conventional continuous reaction process, or the reactive extrusion process, which was developed only recently. In reactive extrusion process to synthesize polymers, the extruder is used as a mini-reactor. First, monomers co-monomers and/or prepolymers are charged into the extruder. The reactants react inside the extruder to produce the polymer material, which is then extruded from the extruder to provide the final product.

The reactive extrusion technology has the following advantages: First, it provides a high area-to-volume ratio for excellent heat transfer. Second, it provides excellent mixing action during the polymerization reaction. This is particularly advantageous for highly viscous fluids, which can also be transported through the reactor. Third, it can be adapted to provide multiple temperature zones, each having a distinct temperature. Fourth, the reactive extruder can be adapted to provide multiple exhaust or vacuum sections, each vacuum section can have the same or different of vacuum. Fifth, it involves a continuous reaction-extrusion process. Sixth, the resident time involved in the process is very short; therefore, the productivity can be very high per unit time. Seventh, the reactive extrusion process requires a much simpler apparatus than most other conventional commercial reactors. Finally, with the reactive extrusion process, the composition of the feed monomers can be conveniently varied; this greatly enhances the utilization efficiency of the capital investment, and is particularly advantageous for production lines that make relatively small quantities of a large variety of products.

With the above mentioned advantages, the reactive extrusion technology potentially can become one of the best methods to produce polymers and copolymers. However, when the reactive extrusion technology is applied to the production of polyamide or copolyamide, current catalyst systems do not provide fast enough reaction rate to take full advantage of this evolving technology. The reaction must be very fast so that the polymerization reaction to make polyamide or copolyamide can be completed in the extruder before they are extruded.

PRIOR ART

Sodium hypophosphite has been widely used as a catalyst during the polymerization of polyamide. For example, Japanese Pat. App. JP 78-62205 discloses a method to make polyamide using sodium hypophosphite as catalyst. Japanese Pat. App. JP 89-179534 discloses the manufacturing of polyamides containing hexamethyleneterephthalamide units using sodium hypophosphite as catalyst. Japanese Pat. App. JP 89-263892 discloses aromatic copolyamides prepared in the presence of sodium hypophosphite.

Polymerization additives containing other than sodium hypophosphite have also been reported. Japanese Pat. App. JP 89-70404 discloses the use of sodium hypophosphite and MeOH during the polymerization of high-molecular weight hexamethylene-terephthalamide polymers. In Japanese Pat. App. 87-28152, the additives further contain alkylenediamine and monocarboxylic acids or primary or secondary monoamines. Canadian Pat. No. 963594 discloses heat-stable nylon 66 fibers with improved dyeability by adding sodium hypophosphite and diphenylamine into the nylon salt solution before polymerization reaction. Japanese Pat. App. JP 89-191926 discloses polyamide compositions with good resistance to flame and heat. Alkaline earth metal hypophosphites are used as catalyst in the polymerization reaction. U.S. Pat. No. 4,113,708 discloses a method using phenylphosphinic acid to reduce the formation of ammonia during the melt preparation of polyamide. Ger. Offen. DE 2158014 discloses a method to stabilize nylon 66 by adding alkali metal hypophosphite into amides and adipate before polymerization. Japanese Pat. Apps. JP 89-179,534 and JP 90-111015 disclose a method for the manufacturing of polyamides by first polymerizing diacids with diamine in the presence of a hypophosphite to give an oligomer then melt polymerizing the oligomer in the presence of a polyethylene was. Great Britain Pat. App. GB 6648485 discloses a heat and light stabilizing additive for polyamide by adding sodium hypophosphite and phenols containing at least one hydrocarbon radical and a radical containing a COOH group or a derivative, to polyamide after or during polycondensation. In Japanese Pat. App. JP 89-212160, the polymerization additives contain manganese hypophosphite, hexamethylenediamine, and triazine compounds, which are added to reactants as fire retardants.

Hypophosphites have also been used as additives to modify the properties of polyamide and/or copolyamide after the completion of the polymerization reaction. U.S. Pat. No. 2,510,777 teaches a modified polyamide having improved stability at elevated temperatures by incorporating into the polyamide a minor amount by weight of hypophosphorous compound. Eur. Pat. App. EP 90-101760 discloses polyamide compositions with improved oxidative stability; the additives disclosed therein including a low-temperature antioxidant from a halogenated hydroxyl ammonium compound, hydrosulfide, bisulfite, phosphorus, and phosphate and a reducing agent from metal hypophosphite and ammonium hypophosphite. Ger. Offen. DE 3636023 discloses a granulated thermoplastics for hot-melt adhesives by mixing copolyamides with refined paraffin and sodium hypophosphite. Japanese Pat. App. JP 85-198900 discloses a polyamide resin composition by blending polyamides with modified polyolefin resins and metal salts of $H_3PO_4$, $H_3PO_3$ and $H_3PO_2$. Japanese Pat. App. JP 81-34897 discloses a method for surface-sensitizing polyamide with sodium hydroxide and sodium hypophosphite. Japanese Pat. App. JP 78-97229 discloses using sodium hypophosphite as a heat stabilizer for copolyamide. Belg. BE 875530 discloses nonflammable polyester, polyamide and polyester-polyamide compositions by mixing polymers or copolymers with phosphinate salts. Japanese Pat. App. JP 90-208135 discloses a polyhexamethyleneadipamide with restricted three-dimensional structure. Copper acetate, potassium iodide or sodium hypophosphite is added to the final polymerized product as stabilizers. Japanese Pat. App. JP 90-116874 discloses mixing of sodium hypophosphite or calcium acid hypophosphite with polyamide, to prevent discolorization. Japanese Pat. App. JP 88-331806 discloses the use of hypophosperous acid or hypophosphite as anti-coloring agent for polyamide fillers. Japanese Pat. App. JP 88-273376 discloses an injection moulded aliphatic polyamide container comprising a polyamide and additives selected from orthophosphorous acid, hypophosphorous acid, alkali metal salts and alkaline salts. Eur. Pat. App. EP 88-305493 discloses a method by which sodium hypophosphite and a cross-linking agent are added to a linear aliphatic polyamide to improve its melt viscosity.

Examples of prior art literature disclosing the use of reactive extruders include U.S. Pat. No. 4,603,166 which teaches a crystalline polyamide composition prepared from aliphatic diamines and either mixtures of terephathalic acid and adipic acid or mixtures of terephathalic acid, isophthalic acid and adipic acid. Sodium hypophosphite was used as catalyst. Ger.Offen. DE 3605202 discloses a method for making high viscosity polyamide using a twin screw extruder. A prepolymer melt is made to travel through zones of elevated and reduced pressure which undergoes polycondensation in the extruder. In the high pressure zones, the melt is exposed to superheated steam and in the reduced pressure zones, condensation water and steam are removed from the melt.

SUMMARY OF THE PRESENT INVENTION

The main object of the present invention is to provide catalyst compositions comprising alkali metal hypophosphites as primary catalyst and an organic phosphite as a cocatalysts so that the reaction rate associated with the polymerization of polyamide and copolyamide can be increased over those using prior art catalysts.

The present invention discloses catalyst compositions comprising hypophosphites of alkali metals as primary catalyst and an organic phosphite as cocatalyst to increase the polymerization rate of polyamide and copolyamide. Polyamides are the products of a diacid and a diamine. Copolyamides are the products of a diamine and at least two diacids.

The present invention discloses using organic phosphites as novle cocatalysts which can be selected from following groups:

1. General type phosphites which are represented by the following structure:

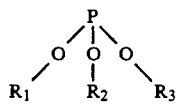

wherein $R_1$, $R_2$, and $R_3$ can be, independently, aliphatic groups or aromatic groups, having 1 to 24 carbons, preferably 4 to 18 carbons. One or two of $R_1$, $R_2$ and $R_3$ can be aliphatic groups and the rest are aromatic groups. The aromatic groups can be naphthalene, benzene or benzene or the derivatives of benzene, preferably benzene or the derivatives of benzene. Examples of the general types of phosphites include diisodecyl pentaerythritol phosphite, triisodecyl phosphite, triisooctyl phosphite, trilauryl phosphite, tristearyl phosphite, trimethyl phosphite, triethyl phosphite, trinonylphenyl phosphite, tris-(2,4-di-tert-butyl-phenol) phosphite, tris-(2,4-dimethylphenol) phosphite, tributyl phosphite, trioctyl phosphite, triisooctyl phosphite, isooctyl diphenyl phosphite, diisooctyl phenyl phosphite, didecyl phenyl phosphite, decyl diphenyl phosphite, didodecyl phenyl phosphite, dodecyl diphenyl phosphite, dodecyl dioctyl phosphite, decyl dioctyl phosphite, di(2,4-di-tert-butylphenyl) dodecyl phosphite, di(2,4-di-tert-butylphenyl) octyl phosphite, 2,4-di-tert-butyl-phenyl diisooctyl phosphite, dinonylphenyl decyl phosphite and diisodecyl nonylphenyl phosphite.

2. Hindered type phosphites represented by the following structure:

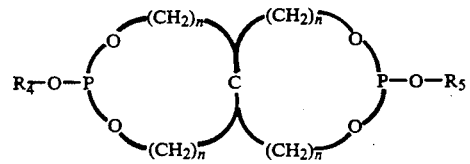

wherein n is an integer from 1 to 10, preferably from 1 to 4. $R_4$ and $R_5$ can be, independently, aliphatic or aromatic groups having 1 to 24 carbons, preferably 1 to 18 carbons. One of $R_4$ and $R_5$ can be an aliphatic group and the other can be an aromatic group. The aromatic groups can be naphthalene, benzene or the derivatives of naphthalene or benzene, preferably benzene or the derivatives of benzene. Examples of the hindered types of organic phosphites include phosphorous acid cyclic neopentanetetrayl dioctadecyl ester, phosphorous acid cyclic neopentanetetrayl dioctyl ester, phosphorous acid cylic neopentanetetrayl diphenyl ester, phosphorous acid cyclic neopentanetetrayl dihexyl ester, phosphorous acid cyclic neopentanetetrayl bis (2,4-di-tert-butylphenyl) ester, phosphorous acid cyclic neopentanetetrayl bis (2,4,6-tri-tert-butylphenyl) ester, phosphorous cyclic neopentanetetrayl bis (2-tert-butylphenyl) ester, phosphorous acid cyclic neopentanetetrayl bis (2,6-di-tert-butylphenyl) ester, phosphorous acid cyclic neopentanetetrayl octyl 2,6-di-tert-butylphenyl ester, phosphorous acid cyclic neopentanetetrayl decyl 2,6-di-tert-butylphenyl ester, phosphorous acid cyclic neopentanetetrayl distearyl ester, phosphorous acid cyclic neopentanetetrayl diphenyl ester, phosphorous acid cyclic neopentanetetrayl phenyl 2,4-di-tert-butylphenyl ester, and phosphorous acid cyclic neopentanetetrayl phenyl decyl ester.

The polyamides and copolyamides disclosed in the present invention are synthesized from diacids and diamines. The diacids include aliphatic diacids and aromatic diacids, wherein the aliphatic diacids have the following general structure:

Wherein n ranges from 1 to 24, preferably from 2 to 18. Examples of aliphatic diacids that can be used in this invention include adipic acid, sebacic acid, azelaic acid, and 1, 12-dodecanedioic acid. Example of the aromatic diacids include isophthalic acid and terephthalic acid.

The diamines have the following general structure:

$H_2N(CH_2)_nNH_2$ wherein n ranges from 1 to 10, preferably from 2 to 8. Examples of diamines include 1,4-tetramethylene diamine, 1,6-hexamethylene diamine, 1,8-octamethylene diamine and 1,5-pentamethylene diamine.

The present invention will be substantially illustrated in the following examples. It should be noted that these examples are intended only to aid the understanding of this invention; it should further be understood that the scope of this invention, which is intended to be determined by the appended claims, is by no means limited by these examples.

DESCRIPTION OF THE PREFERRED EMBODIMENTS

EXAMPLE 1 (preparation of prepolymers)

The reactants comprised 146.14 g of adipic acid, 120 g of hexamethylene diamine, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 1 hour. Subsequently, the external temperature of the reactor was raised to 270° C. for 1 hour. Thereafter, the temperature was raised to 320° C. During the temperature increase sequence, if the pressure inside the reactor exceeded 3 Kg/cm², the pressure would be released to 0 Kg/cm². Finally when the temperature inside the reactor reached 260° C., the reactor pressure was released to 0 Kg/cm², and the material was removed from the reactor. This completed the polymerization reaction. After the polymerization reaction, Nylon 66 prepolymer was produced which has a relative viscosity of 1.36. The relative viscosity assumed that the viscosity of concentrated sulfuric acid (more than 96%) is 1 g/dl in a Cannon Ubbelohde Size 200 (B194) capillary viscometer at 30° C.

EXAMPLE 2 (prior art)

Prepare prepolymers which are synthesized according to the method described in Example 1. Add 0.3 g to 0.4 g of the Nylon 66 prepolymer into a stainless steel tube reactor. Seal the stainless steel tube reactor, and place the reactor into tin bath at 360° C. for 6 minutes. The inner temperature of the reactor is approximately 260° C. The inner pressure of the reactor is approximately 73 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 66 polymer. Measure the relative viscosity of the sample. The relative viscosity of the polymer is 1.56.

Example 3 (this Invention)

Prepare the Nylon 66 prepolymer which is synthesized according to the method described in Example 1, and all the reaction conditions are the same as those in Example 2, except that 2 PHR (parts per hundred parts of reactants, by weight) of isooctyl diphenyl phosphite (Commercial name Mark C, a general type phosphite) were added into the reactor. After the reaction is completed according to the method described in Example 2, the relative viscosity is measured. The product is a Nylon 66 polymer.

The relative viscosities of reaction products from Examples 1 through 3 are listed in Table 1. The relative viscosities of the Nylon 66 polymers that are synthesized using the organic phosphite as cocatalyst are higher than those without the organic phosphite cocatalyst, indicating a more complete reaction within the same reaction time by the addition of the organic phosphite cocatalyst disclosed in this invention.

TABLE 1

| Example No. | Polymer Composition | Relative Viscosity |
|---|---|---|
| 1 | Nylon 66 prepolymer | 1.36 |
| 2 | Nylon 66 polymer (w/o cocatalyst) | 1.56 |
| 3 | Nylon 66 polymer (with organic phosphite as cocatalyst) | 1.90 |

EXAMPLE 4 (preparation of prepolymer)

The reactants comprised 160 g of isophthalic acid, 120 g of hexamethylene diamine, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 1 hour. Subsequently, the external temperature of the reactor was raised to 270° C. for 1 hour. Thereafter, the temperature was raised to 340° C. During the temperature increase sequence, if the pressure inside the reactor exceeded 3 Kg/cm², the pressure would be released to 0 Kg/cm². Finally when the temperature inside the reactor reached 270° C., the reactor pressure was released to 0 Kg/cm², and the material was removed from the reactor. This completed the polymerization reaction. After the polymerization reaction, Nylon 6I prepolymer was produced which has a relative viscosity of 1.96.

Example 5 (Prior Art)

Use Nylon 6I prepolymer from Example 4 instead of the Nylon 66 prepolymer in Example 2. All the other conditions are the same as those in Example 2. The relative viscosity of Nylon 6I polymer from this reaction is 4.0.

Example 6 (this Invention)

Use Nylon 6I prepolymer in Example 4 instead of Nylon 66 prepolymer in Example 2. The reactants are Nylon 6I prepolymer and 1 PHR of isooctyl diphenyl phosphite, which is a general type phosphites. All the other conditions are the same as those in Example 2. The relative viscosity of the Nylon 6I polymer prepared using the organic phosphite as cocatalyst is higher than that of the Nylon 6I polymer prepared without cocatalyst.

Table 2 compares the relative viscosities of Nylon 6I polymers from Examples 4 through 6.

TABLE 2

| Example No. | Polymer Composition | Relative Viscosity |
|---|---|---|
| 4 | Nylon 6I prepolymer | 1.96 |

TABLE 2-continued

| Example No. | Polymer Composition | Relative Viscosity |
|---|---|---|
| 5 | Nylon 6I polymer (w/o cocatalyst) | 4.00 |
| 6 | Nylon 6I polymer (with organic phosphite as cocatalyst) | 4.83 |

Example 7 (Preparation of Prepolymer)

The reactants comprised 3650 g of adipic acid, 4150 g of terephthalic acid, 6000 g of hexamethylene diamine, 2450 g of distilled water, and 13.8 g of sodium hypophosphite. The diamine was first added to the distilled to make a mixture solution. After the reactants were charged into the reactor at room temperature, nitrogen gas was introduced into the reactor several times to purge air from the reactor. Then the reactor was closed and the external heat was applied to the reactor. After about 50-60 minutes, the external temperature of the reactor reached 240° C. and the internal temperature of the reactor was about 200° C. Subsequently, the external temperature of the reactor was maintained at 240°-250° C. for thirty minutes. At this time, the internal temperature of the reactor was about 200°-210° C. Thereafter, the external temperature of the reactor was raised to 250°-260° C. and the internal temperature increased to 210°-230° C. Finally when the temperature inside the reactor reached 230° C. (the external temperature was at 270° C.), the reactor pressure was released to 0 Kg/cm$^2$, and the material was removed from the reactor. At anytime during the reaction stage, the pressure would be released to 3 kg/cm$^2$ if the pressure exceeded 10 Kg/cm$^2$. This completed the polymerization reaction. After the polymerization reaction, Nylon 66 T prepolymer was produced which has a relative viscosity of 1.13.

Example 8 (Prior Art)

Prepare prepolymers according to the procedures described in Example 7. Add 0.3 g to 0.4 g of the Nylon 66 T prepolymer into a stainless steel tube reactor. Seal the stainless steel tube reactor, and place the reactor into a tin bath at 385° C. for 20 minutes. The inner temperature of the reactor is approximately 320° C. The inner pressure of the reactor is approximately 30 cm Hg (76 cm Hg being absolute vacuum). Remove the reactor from the tin bath and cool the reactor in the air for 1 minute. Then cool the reactor with water until the temperature of the reactor reached room temperature. Open the reactor to remove the sample. The product is a Nylon 66 T polymer. Measure the relative viscosity of the sample. The relative viscosity of the polymer is 2.75.

Example 9 (this Invention)

The prepolymer is synthesized according to the method described in Example 7, and all the reaction conditions are the same as those in Example 8, except that 0.5 PHR of various types organic phosphite cocatalysts were added into the reactor. The compositions of the organic phosphites are shown in Table 3. After the reaction is completed according to the method described in Example 8, the relative viscosity is measured. The product is a Nylon 66 T polymer.

The relative viscosities of reaction products from Examples 7 through 9 are listed in Table 4. The relative viscosities of the Nylon 66 T polymers that are synthesized using the organic phosphite as cocatalyst are higher than those without a cocatalyst, indicating a more complete reaction within the same reaction time by the addition of the organic phosphite cocatalyst disclosed in this invention.

TABLE 3

| Example No. | Organic Phosphite Composition |
|---|---|
| 9-A | trinonylphenyl phosphite (a general type organic phosphite) |
| 9-B | phosphorous acid cyclic neopentanetetrayl dioctadecyl ester (a hindered type organic phosphite) |

Table 4 compares the Relative Viscosities of Nylon 66 T polymers from Examples 7 through 9.

TABLE 4

| Example No. | Polymer Composition | Relative Viscosity |
|---|---|---|
| 7 | Nylon 66T prepolymer | 1.13 |
| 8 | Nylon 66T polymer (w/o cocatalyst) | 2.75 |
| 9-A | Nylon 66T polymer (with organic phosphite as cocatalyst) | 4.10 |
| 9-B | Nylon 66T polymer (with organic phosphite as cocatalyst) | 3.51 |

Example 10 (Prior Art)

Prepare prepolymers according to the procedures described in Example 7. Add 0.3 g to 0.4 g of Nylon 66 T propolymer into a stainless steel tube reactor. Seal the stainless steel tube reactor, and place the reactor into a tin bath at 380° C. for 12 minutes. The inner temperature of the reactor was approximately 312° C. The inner pressure of the reactor is approximately 30 cm Hg (76 cm Hg being absolute vacuum). Remove the reactor from the tin bath and cool the reactor in the air for 1 minute. Then cool the reactor with water until the temperature of the reactor reached room temperature. Open the reactor to remove the sample. The product is a Nylon 66 T polymer. Measure the relative viscosity of the sample. The viscosity of the polymer is 1.67.

Example 11 (this Invention)

The prepolymer is synthesized according to the method described in Example 7, and the other reaction conditions are the same as those in Example 10, except that 0.5 PHR of various types organic phosphites were added into the reactor. The compositions of the organic phosphites are shown in Table 5. After the reaction is completed according to the method described in Example 10, the relative viscosity is measured. The product is a Nylon 66T polymer.

The relative viscosities of reaction products from Examples 7, 10 and 11 are listed in Table 6. The relative viscosities of the Nylon 66T polymers that are synthesized using the organic phosphites as cocatalyst are higher than those without a cocatalyst, indicating a more complete reaction within the same reaction time by the addition of the organic phosphite cocatalyst disclosed in this invention.

TABLE 5

| Example No. | Organic Phosphite Composition |
|---|---|
| 11-A | triisodecyl phosphite (a general type organic phosphite) |
| 11-B | isooctyl diphenyl phosphite (a general type organic phosphite) |
| 11-C | phosphorous acid cyclic neopentanetetrayl bis (2,4-d-i-tert-butylphenyl) ester (a hindered type organic |

TABLE 5-continued

| Example No. | Organic Phosphite Composition |
|---|---|
| | phosphite) |

TABLE 6

| Example No. | Polymer Composition | Relative Viscosity |
|---|---|---|
| 7 | Nylon 66T prepolymer | 1.13 |
| 10 | Nylon 66T polymer (w/o cocatalyst) | 1.67 |
| 11-A | Nylon 66T polymer (with organic phosphite as cocatalyst) | 3.26 |
| 11-B | Nylon 66T polymer (with organic phosphite as cocatalyst) | 2.57 |
| 11-C | Nylon 66T polymer (with organic phosphite as cocatalyst) | 1.90 |

Example 12 (Preparation of Prepolymers)

The reactants comprised 120 g of hexamethylene diamine, 116.2 g of isophthalic acid, 49.8 g of terephthalic acid, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 40 minutes. Subsequently, the external temperature of the reactor was raised to 270° C. for 40 minutes. Thereafter, the temperature was raised to 340° C. During the temperature increase sequence, if the pressure inside the reactor exceeded 3 Kg/cm², the pressure would be released to 0 Kg/cm². Finally when the temperature inside the reactor reached 290° C., the reactor pressure was released to 0 Kg/cm², and the material was removed from the reactor. This completed the polymerization reaction. After the polymerization reaction, Nylon 6IT prepolymer was produced which has a relative viscosity of 2.04.

Example 13 (Prior Art)

Prepare prepolymers which are synthesized according to the method described in Example 12. Add 0.3 g to 0.4 g of Nylon 6IT prepolymer into a stainless steel tube reactor. Seal the stainless steel tube reactor, and place the reactor into tin bath at 360° C. for 6 minutes. The inner temperature of the reactor was approximately 260° C. The inner pressure of the reactor is approximately 73 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 6IT polymer. Measure the relative viscosity of the sample. The relative viscosity of the polymer is 2.58.

Example 14 (this Invention)

Prepare the Nylon 6IT prepolymer which is synthesized according to the method described in Example 12, and all the reaction conditions are the same as those in Example 13, except that 2 PHR of isooctyl diphenyl phosphite (Commercial name Mark C) were added into the reactor. After the reaction is completed according to the method described in Example 13, the relative viscosity is measured. The product is a Nylon 6IT polymer.

The relative viscosities of the reaction products from Examples 12 through 14 are listed in Table 7. The relative viscosities of the Nylon 6IT polymers that are synthesized using the organic phosphite as cocatalyst are higher than those without the organic phosphite cocatalyst, indicating a more complete reaction within the same reaction time by the addition of the organic phosphite cocatalyst disclosed in this invention.

TABLE 7

| Example No. | Polymer Composition | Relative Viscosity |
|---|---|---|
| 12 | Nylon 6IT prepolymer | 2.04 |
| 13 | Nylon 66 polymer (w/o cocatalyst) | 2.58 |
| 14 | Nylon 66 polymer (with organic phosphite as cocatalyst) | 3.10 |

Example 15 (Preparation of Prepolymers)

The reactants comprised 120 g of hexamethylene diamine, 73 g of adipic acid, 40 g of isophthalic acid, 43 g of terephthalic acid, 49 g of distilled water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for one hour. Subsequently, the external temperature of the reactor was raised to 270° C. for one hour. Thereafter, the temperature was raised to 340° C. During the temperature increase sequence, if the pressure inside the reactor exceeded 3 Kg/cm², the pressure was released to 0 Kg/cm². Finally when the temperature inside the reactor reached 275° C., the reactor pressure was released to 0 Kg/cm², and the material was removed from the reactor. This completed the polymerization reaction. After the polymerization reaction, Nylon 66IT prepolymer was produced which has a relative viscosity of 2.26.

Example 16 (Prior Art)

Prepare prepolymers which are synthesized according to the method described in Example 15. Add 0.3 g to 0.4 g of the Nylon 66IT prepolymer into a stainless steel tube reactor. Seal the stainless steel tube reactor, and place the reactor into tin bath at 360° C. for 8 minutes. The inner temperature of the reactor is approximately 285° C. The inner pressure of the reactor is approximately 72 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 66IT polymer. Measure the relative viscosity of the sample. The relative viscosity of the polymer is 5.96.

Example 17 (this Invention)

Prepare the Nylon 66IT prepolymer which is synthesized according to the method described in Example 15, and the other reaction conditions are the same as those in Example 16, except that 1 PHR of triisooctyl phosphite (commercial name Weston TDD) was added into the reactor. After the reaction is completed according to the method described in Example 16, the relative viscosity is measured. The product is a Nylon 66IT polymer.

The relative viscosities of reaction products from Examples 15 through 17 are listed in Table 8. The relative viscosities of the Nylon 66IT polymers that are synthesized using the organic phosphite as cocatalyst are higher than those without the organic phosphite cocatalyst, indicating a more complete reaction within the same reaction time by the addition of the organic phosphite cocatalyst disclosed in this invention.

TABLE 8

| Example No. | Polymer Composition | Relative Viscosity |
|---|---|---|
| 15 | Nylon 66IT prepolymer | 2.26 |
| 16 | Nylon 66IT polymer (w/o cocatalyst) | 5.96 |
| 17 | Nylon 66IT polymer (with organic phosphite as cocatalyst) | 7.12 |

Example 18 (Prior Art)

Grind the Nylon 66T prepolymer from Example 7 into powders, and feed the powder into a twin screw extruder (W & P ZSK 30 model, with a diameter of 30 mm and an L/D of 27). Then extrude the reactants. The conditions of extrusion are described in the following paragraph.

The reaction temperatures are 280° C. in the first stage, 320° C. in the second stage, 340° C. in the third stage, 340° C. in the fourth stage, and 340° C. in the fifth stage. The temperature of the die is 340° C. The pressure of the fourth stage is 30 cm Hg. The rotation speed of the screw is 100 rpm, representing an average resident time of about two minutes.

Example 19 (this Invention)

The reactants are Nylon 66T prepolymer and 0.3 PHR of various types organic phosphites as listed in Table 9. All the other conditions are the same as those in Example 18. The relative viscosities of reaction products from Examples 18 and 19 are listed in Table 10. The relative viscosities of the Nylon 66T polymers that are synthesized using the organic phosphite as cocatalyst are higher than those without the organic phosphite cocatalyst.

TABLE 9

| Example No. | Organic Phosphite Composition |
|---|---|
| 19-A | phosphorous acid cyclic neopentanetetrayl dioctadecyl ester (a hindered organic phosphite) |
| 19-B | phosphorous acid cyclic neopentanetetrayl bis(2,4-d-i-tert-butylphenyl) ester (a hindered organic phosphite) |

TABLE 10

| Example No. | Polymer Composition | Relative Viscosity |
|---|---|---|
| 7 | Nylon 66T prepolymer | 1.13 |
| 18 | Nylon 66T polymer (w/o cocatalyst) | 2.77 |
| 19-A | Nylon 66T polymer (with organic phosphite as cocatalyst) | 4.10 |
| 19-B | Nylon 66T polymer (with organic phosphite as cocatalyst) | 3.28 |

From all the tables shown above, it is evident that the addition of organic phosphite as a cocatalyst, in the presence of a primary catalyst, increases the reaction rate to produce polyamide and/or copolyamide.

What is claimed is:

1. A method for the preparation of polyamide/-copolyamide comprising the steps of:
   (a) charging predetermined amounts of adipic acid, diamine, water, and a primary catalyst, which comprises an alkali metal hypophosphite, into first reactor;
   (b) purging air from said first reactor;
   (c) raising the temperature of said first reactor to 240° C. to 300° C. to effect the production of a prepolymer of said polyamide/copolyamide;
   (d) charging said prepolymer and a predetermined amount of an organic phosphite cocatalyst into a second reactor; and
   (e) raising the temperature of said second reactor to between 260° C. and 340° C. to effect the production of said polyamide/copolyamide.

2. The method of preparing polyamide/copolyamide of claim 1 wherein the molar ratio between said primary catalyst and said diamine ranges from $3.1 \times 10^{-4}$ to $1.5 \times 10^{-1}$.

3. The method of preparing polyamide/copolyamide of claim 1 wherein the molar ratio between said organic phosphite cocatalyst and said diamine ranges from $3.1 \times 10^{-4}$ to $1.5 \times 10^{-1}$.

4. The method of preparing polyamide/copolyamide of claim 1 wherein said alkali metal hypophosphite is sodium hypophosphite.

5. The method of preparing polyamide/copolyamide of claim 1 wherein said organic phosphite cocatalyst is represented by the following formula:

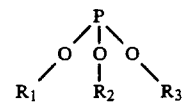

wherein $R_1$, $R_2$, and $R_3$ are, independently, selected from the group consisting of aliphatic and aromatic radicals.

6. The method of preparing polyamide/copolyamide of claim 5 wherein said aliphatic radicals contain 1 to 24 carbon atoms.

7. The method of preparing polyamide/copolyamide of claim 5 wherein said aliphatic radicals contain 4 to 18 carbon atoms.

8. The method of preparing polyamide/copolyamide of claim 5 wherein said aromatic radicals are selected from the group consisting of naphthalene, benzene, and derivatives of benzene.

9. The method of claim 1 wherein said organic phosphite cocatalyst is represented by the following structure:

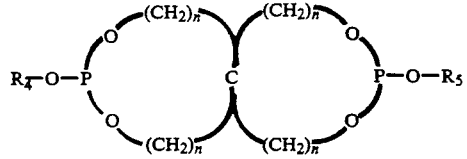

wherein n is an integer from 1 to 10, and $R_4$ and $R_5$ are, independently, selected from the group consisting of aliphatic and aromatic radicals.

10. The method of preparing polyamide/copolyamide of claim 9 wherein n is an integer from 1 to 4.

11. The method of preparing polyamide/copolyamide of claim 9 wherein said aliphatic radicals contain 1 to 24 carbon atoms.

12. The method of preparing polyamide/copolyamide of claim 9 wherein said aliphatic radicals contain 1 to 18 carbon atoms.

13. The method of preparing polyamide/copolyamide of claim 9 wherein said aromatic radicals are selected from the group consisting of naphthalene, benzene, and derivatives of benzene.

14. A method for the preparation of polyamide/copolyamide comprising the steps of:
   (a) charging predetermined amounts of adipic acid, diamine, water, a primary catalyst, which comprises an alkali metal hypophosphite, and an organic phosphite cocatalyst into first reactor;
   (b) purging air from said first reactor;
   (c) raising the temperature of said first reactor to 240° C. to 300° C. to effect the production of a prepolymer of said polyamide/copolyamide;
   (d) charging said prepolymer into a second reactor; and
   (e) raising the temperature of said second reactor to between 260° C. and 340° C. to effect the production of said polyamide/copolyamide.

* * * * *